United States Patent [19]

Ravin

[11] E Patent Number: Re. 33,051

[45] Reissued Date of Patent: Sep. 12, 1989

[54] DIESEL HEAT PUMP

[75] Inventor: Robert H. Ravin, Bradenton, Fla.

[73] Assignee: Electric Specialty, Inc., Tampa, Fla.

[21] Appl. No.: 192,876

[22] Filed: May 2, 1988

Related U.S. Patent Documents

Reissue of:

[64] Patent No.: 4,658,771
Issued: Apr. 21, 1987
Appl. No.: 778,132
Filed: Sep. 20, 1985

[51] Int. Cl.[4] ..... F02N 17/04

[52] U.S. Cl. ..... 123/142.5 R; 123/142.5 E

[58] Field of Search ..... 123/142.5 R; 165/21

[56] References Cited

U.S. PATENT DOCUMENTS

| | | | |
|---|---|---|---|
| 2,076,382 | 4/1937 | Minton | 123/142.5 R |
| 2,257,975 | 10/1941 | Miller | 165/21 |
| 2,332,149 | 10/1943 | Horton | 123/142.5 R |
| 3,795,234 | 3/1974 | Stolz | 123/142.5 R |
| 4,245,593 | 1/1981 | Stein | 123/142.5 R |
| 4,249,491 | 2/1981 | Stein | 123/142.5 R |

*Primary Examiner*—E. Rollins Cross
*Attorney, Agent, or Firm*—James H. Beusse

[57] ABSTRACT

A diesel powered emergency electrical generator for providing a back-up power supply for critical building systems. The diesel engine is heated by a heat pump in series with a resistance heater. The heat pump is normally cycled on and off to maintain the desired engine temperature and the resistance heater is employed only when the heat pump is unable, for whatever reason, to maintain the desired engine temperature. The heat pump includes a refrigerant to coolant condenser and an air to refrigerant evaporator and includes a centrifugal pump which operates continuously to maintain a continuous circulation of coolant through the engine and through the heat pump.

14 Claims, 1 Drawing Sheet

DIESEL HEAT PUMP

Matter enclosed in heavy brackets [ ] appears in the original patent but forms no part of this reissue specification; matter printed in italics indicates the additions made by reissue.

This invention relates to means for providing heat to the coolant flowing through the jackets of an internal combustion engine and, more particularly, relates to a means for providing heat to the coolant of the diesel engine of a diesel powered emergency electrical generator assembly.

Many commercial and industrial facilities have one or more diesel powered emergency electrical generators to provide a back-up power supply for critical systems in the building such as elevators, lights and computer equipment.

A critical requirement of diesel engines for instantaneous starting and proper performance is to maintain the engine at a predetermined temperature. Typically, the recommended temperature is approximately 100° F. The most common method of providing heat to maintain the required engine temperature is with a resistance electrical heating element. The element is typically located somewhere within the liquid cooling system of the engine and heat is transferred by thermosiphon action through the water jackets. A thermostat operates to shut off the resistance heating element when the engine temperature reaches a predetermined set point temperature. Whereas these electrical resistance heaters are effective to maintain the required predetermined engine temperature in most applications, they typically operate a very high percentage of the total standby and operating time of the engine and have proven to be rather energy inefficient.

SUMMARY OF THE INVENTION

This invention is directed to providing a more energy efficient system for maintaining an internal combustion engine at a predetermined set point temperature.

More particularly, this invention is directed to providing an improved engine heater for the diesel engine of a diesel powered emergency electrical generator set.

Broadly considered, the invention provides an internal combustion assembly including a water cooled internal combustion engine having combustion chambers and internal coolant conduit means extending therethrough between a coolant inlet and a coolant outlet in heat exchange relation to the combustion chambers; external coolant conduit means extending outside of the engine between the coolant outlet and the coolant inlet to form a closed coolant loop with the internal coolant conduit means; and heater means operative to pass a heated fluid in heat exchange relation to the external coolant conduit means to heat the coolant flowing therethrough. This arrangement has proven to provide an extremely energy efficient manner for maintaining the internal combustion engine at a predetermined set point temperature.

According to a further feature of the invention, the heater means comprises a heat pump including a condenser in which gaseous refrigerant is passed in heat exchange relation to the external coolant conduit means and an evaporator in which ambient air is passed in heat exchange relation to the refrigerant.

According to a further feature of the invention, the assembly further includes an electrical resistance heater in heat exchange relation to the coolant flowing through the external coolant conduit means. The resistance heater, which may comprise an existing resistance heater previously installed on the engine, is arranged in series with the heat pump and is associated with a portion of the external conduit means between the heat pump and the coolant inlet. This arrangement provides a redundant arrangement whereby either the heat pump or the resistance heater may be utilized to maintain the engine at the predetermined set point temperature.

According to a further feature of the invention, the resistance heater is deenergized in normal usage and the work of heating the coolant and thereby the engine is done by the heat pump. In the disclosed embodiment, the resistance heater is controlled by a thermostat and is energized only in the event that the coolant leaving the heat pump is sensed to have a temperature below a desired temperature. With this arrangement, the heat pump cycles on and off in response to sensed internal engine temperature to normally maintain the desired predetermined internal engine temperature and the resistance heater is available as a back-up or stand-by in the event that the heat pump is unable to maintain the desired temperature.

According to a further feature of the invention, the cool air leaving the evaporator is directed to the generator driven by the engine so as to cool the generator. This arrangement allows the ambient air to be utilized to both heat the internal combustion engine and cool the generator to further contribute to the overall energy efficiency of the invention system.

DETAILED DESCRIPTION OF THE PREFERRED EMBODIMENT

Figure 1:
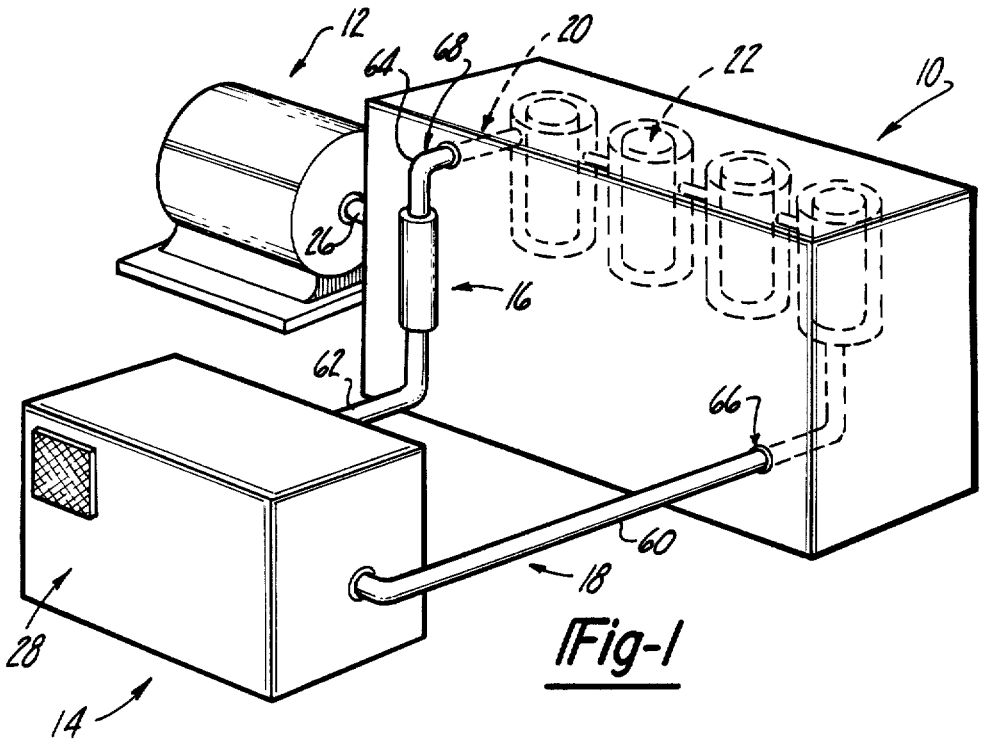
FIG. 1 is a perspective view of the invention internal combustion assembly.
Figure 2:
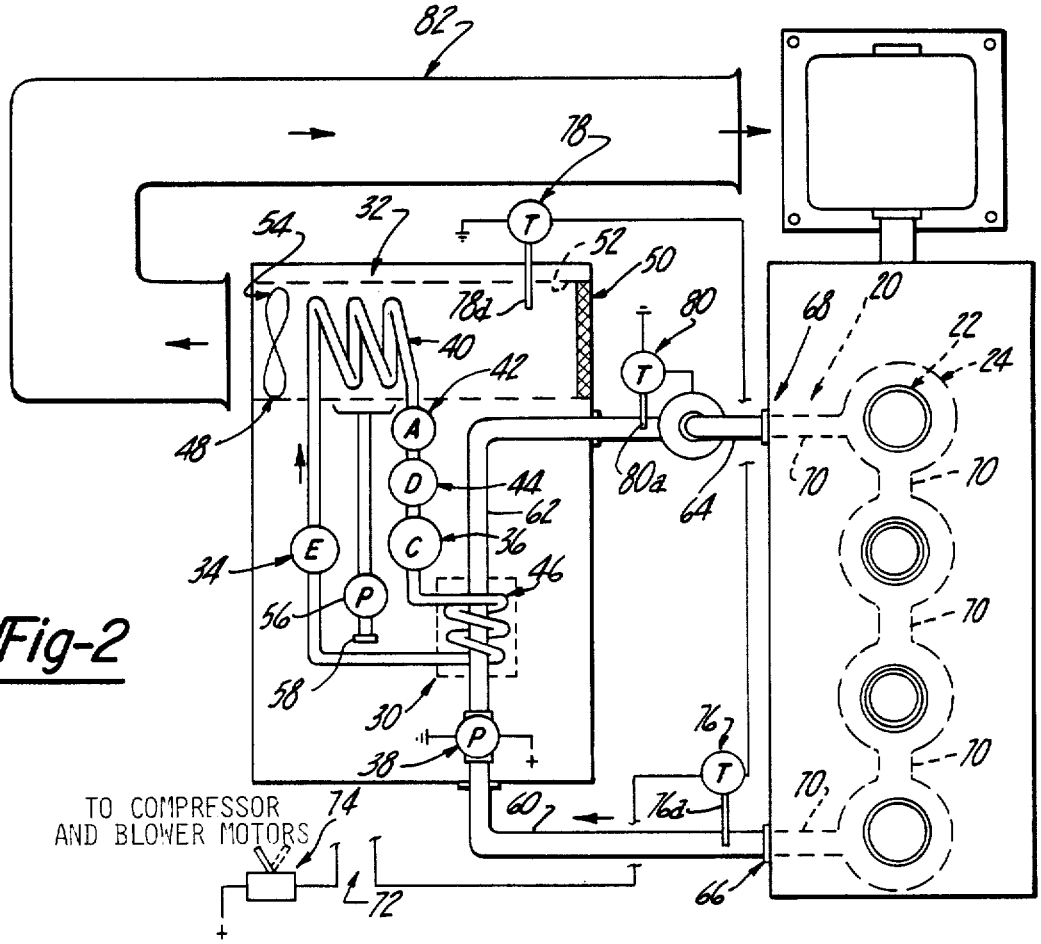
FIG. 2 is a schematic view of the invention internal combustion assembly.

The invention internal combustion assembly, broadly considered, includes an internal combustion engine 10; a generator 12; a heat pump 14; a resistance heater 16; external coolant conduit means 18; and internal coolant conduit means 20.

Internal combustion engine 10 may take any known form but, in the contemplated commercial embodiment, comprises a diesel engine of known construction including cylinders 22 in which a suitable fuel/air mixture is supplied in a known manner and in which the fuel/air mixture is ignited in known manner to provide the power output for the engine. Interconnected cooling jackets 24 surround each cylinder in a known manner.

The generator 12 is of known form and is driven by a shaft 26 from engine 10. Generator 12 may, for example, constitute the emergency electrical backup power supply for critical systems in a building such as elevators, lights and computer equipment.

Heat pump 14 includes a housing 28; a water to refrigerant heat exchanger or condenser 30; an air to refrigerant heat exchanger or evaporator 32; an expansion valve 34; a compressor 36; and a centrifugal circulating pump 38. A suitable refrigerant is circulated in series through heat pump 14 from expansion valve 34, through the coil 40 of the evaporator 32, through an accumulator 42, through a dryer 44, through compressor 36, through the coil 46 of condenser 30, and back to expansion valve 34.

More specifically, the refrigerant, with its temperature raised by sensible energy and compression is pumped by compressor 36 in gaseous form into condenser 30. As the refrigerant passes through the condenser it changes phase to a liquid and gives up its phase change energy to coolant flowing through the condenser. The liquid refrigerant leaving the condensor 30 flows to expansion valve 34 and is converted to a liquid/gas mixture leaving valve 34. The liquid/gas mixture then enters evaporator 32 at well below ambient temperature, absorbs heat from the ambient air and leaves the evaporator in totally gaseous phase, whereafter it enters compressor 36 to begin another cycle.

A blower 48 operates to suck air in through a filter 50 located in an air inlet 52 for passage over evaporator coil 40 and discharged through an air outlet 54. A condensate pump 56 cooperates with a condensate drain 58 to remove condensate from evaporator 32.

Resistance heater 16 is of known form and includes an electrical resistance heating element suitably positioned in heat exchange relation to coolant flowing therethrough so that when the resistance heater is energized the coolant is heated by the resistance heater.

External coolant conduit means 18 includes a conduit 60, a conduit 62, and a conduit 64. Conduit 60 extends from a coolant outlet 66 in the lower portion of the block of engine 10 and through housing 28 of heat pump 14 for communication with the inlet of circulating pump 38. Conduit 62 extends from the outlet of pump 38, passes through coil 46 of condenser 30, and then passes outwardly through housing 28 for communication with the lower end of resistance heater 16. Conduit 64 extends from the upper or outlet end of resistance heater 16 to a coolant inlet 68 in the upper portion of the block of engine 10. Internal coolant means 20 includes suitable passage means 70 defined in the engine block and providing fluid communication between coolant inlet 68 and jackets 24, between the several jackets 24, and between the jackets 24 and coolant outlet 66 so as to define, in combination, a continuous coolant passage extending from coolant inlet 68 to coolant outlet 66.

The internal combustion assembly of the invention further includes a control means seen schematically at 72. Control means 72 includes an on/off switch 74; a thermostat assembly 76; and a further thermostat assembly 78. Thermostat assembly 76 includes a sensor element 76a in communication with the coolant leaving the engine block at coolant outlet 66. Thermostat assembly 78 includes a sensor element 78a for sensing the temperature of air entering the air inlet 52 of evaporator heat exchanger 32.

The invention internal combustion assembly further includes a thermostatic assembly 80 including a sensor element 80a for sensing the temperature of the coolant entering resistance heater 16.

OPERATION

As indicated, the invention internal combustion assembly is intended to provide an emergency electrical back-up power supply for critical systems in buildings such as elevators, lights and computer equipment. In a typical situation, the engine 10 is not operating but rather is on a stand-by basis. It is imperative however that the engine temperature be maintained at a certain optimal level to provide ready start-up and optimal performance at such time as the internal combustion assembly is called upon to provide back-up power. Accordingly, pump 38 operates continuously to provide a continuous circulation of coolant through external conduit means 18 and internal conduit means 20 which together provide a closed coolant loop. Thermostat assembly 76 continuously senses the temperature of the coolant leaving engine 10 and switches heat pump 14 on and off in response to the sensed coolant temperature. When the coolant leaving outlet 66 drops below a predetermined set point temperature corresponding to the desired temperature at the engine block, thermostat 76 functions to close a circuit to the motors driving compressor 36 and blower 48 so that the heat pump becomes operative to extract heat from the air flowing through evaporator 32 and impart phase change heat to the coolant flowing in conduit 62 through condensor 30. The heat pump continues to operate until thermostat 76 senses that the coolant leaving coolant outlet 66 has achieved the set point temperature whereupon the thermostat functions to deenergize the heat pump.

Whereas the prior art resistance heater is typically operated close to 100% of the time, the invention internal combustion assembly, in a typical installation, has been found to operate between 36% and 44% of the time under actual test conditions, and in comparisons with prior art resistance heaters, the invention internal combustion assembly has been found to provide at least a 50% reduction in energy consumption to maintain a given engine block temperature.

The invention internal combustion assembly also provides, as a by-product, dry cool air and this dehumidified cool air can be directed by ducting to adjacent switch or gear rooms or, as shown by the ducting 82, to the generator 12 being driven by engine 12. The invention system thus functions to extract heat from the ambient air and impart it to the coolant flowing through the engine to heat the coolant and further functions to direct the cooled air into heat exchange relation to the generator driven by the engine so as to cool the generator. As indicated, the cooled dehumidified air may alternatively be directed to other equipment in the mechanical rooms associated with the engine assembly.

It will be seen that resistance heater 16 is in series with the heat pump 14 is is situated between the heat pump and the inlet 68 to the engine. Heater 16 is not utilized in the normal operation of the invention system but rather provides a redundant or back-up source of heat for the engine coolant. Specifically, thermostat 80 continuously senses the temperature of the coolant entering the resistance heater 16 and, in response to a sensed coolant temperature that is 5° lower than the desired temperature of the coolant entering the heater 16, the resistance heater is energized to provide supplemental electrical resistance heat to the coolant.

Thermostat 78 functions to totally deenergize the heat pump in the event that the temperature of the air entering inlet 52 drops below a predetermined value. For example, thermostat 78 may be set to disable the heat pump when the temperature of the air entering inlet 52 drops below 48° F., which corresponds to the value at which it is no longer practical to attempt to extract usable heat from the ambient air. At such time as the heat pump is disabled by the thermostat 78, means (not shown) automatically function to energize resistance heater 16 so that the engine coolant is maintained at the desired temperature.

The invention will be seen to provide a extremely energy efficient system for maintaining an internal combustion engine at a predetermined set point temperature. More particularly, the invention will be seen to provide an improved engine heater for the diesel engine of a diesel powered emergency electrical generator set. The improved engine heater operates to maintain the diesel engine at a desired engine temperature with substantially less energy consumption than that required by art resistance heaters and, as an added benefits, cool dehumdified air which may be advantageously employed with respect to associated equipment.

I claim:

1. [An] *A liquid cooled* internal combustion *engine* assembly comprising:

A. a liquid cooled internal combustion engine having combustion chambers and internal coolant conduit means extending therethrough between a coolant inlet and a coolant outlet in heat exchange relation to said combustion chambers;

B. external coolant conduit means extending outside of said engine between said coolant outlet and said coolant inlet and coacting with said internal coolant conduit means to form a closed coolant loop; and C. *means operable independently of said engine for maintaining a coolant circulating through said coolant conduit at above at least a predetermined minimum temperature means, including:* heater means operative to deliver a refrigerant in gaseous form to said external coolant conduit means and condense the refrigerant as it flows in heat exchange relation to said external conduit means to thereby give up the phase change heat to the coolant flowing through the external conduit means.

2. The internal combustion assembly according to claim 1 wherein:

D. said heater means comprises a heat pump;

E. said means for delivering said refrigerant in gaseous form to said external coolant conduit means comprises the condenser of said heat pump; and F. said heat pump further includes (1) an evaporator including means for passing said refrigerant in heat exchange relationship to ambient air, (2) a compressor for receiving said refrigerant as it leaves said evaporator in gaseous form, and (3) an expansion valve for receiving said refrigerant in liquid form as it leaves said condenser.

3. An internal combustion assembly according to claim 1 wherein said assembly further includes:

D. an electrical resistance heater in heat exchange relation to the coolant flowing through said external coolant conduit means.

4. An internal combustion assembly according to claim 3 wherein:

E. said resistance heater is arranged in series with said heater means and is associated with a portion of said external conduit means between said heater means and said coolant inlet.

5. An internal combustion assembly according to claim 4 wherein said assembly further includes:

F. control means including means for sensing an internal temperature of said engine and operative to energize said heater means in response to a sensed temperature below a predetermined set point temperature and deenergize said heater means in response to a sensed temperature above said set point temperature.

6. An internal combustion assembly according to claim 5 wherein:

G. said control means further includes means for sensing the temperature of said coolant as it arrives at said resistance heater and operative to energize said resistance heater in response to a sensed temperature below a predetermined set point temperature.

7. A heater for use with a stationary diesel engine to maintain the engine at a predetermined temperature, said heater comprising:

A. a housing;

B. an inlet for receiving coolant from said engine;

C. an outlet for discharging coolant for delivery to said engine;

D. a conduit extending within said housing between said inlet and said outlet;

E. a condenser coil in heat exchange relation to said conduit;

F. means for passing ambient air through said housing;

G. an evaporator coil in heat exchange relation to said ambient air; and

H. means for moving a phase change fluid serially and cyclically through said evaporator and condenser coils to heat the engine coolant flowing through said conduit.

8. The heater according to claim 7 wherein:

I. said moving means includes an expansion valve between the outlet of said condenser coil and the inlet of said evaporator coil and a compressor between the outlet of said evaporator coil and the inlet of said condenser coil.

9. A heater according to claim 8 wherein:

J. said heater further includes a circulating pump in said conduit for circulating engine coolant through said heater from said inlet to said outlet.

10. A heater according to claim 9 wherein:

K. said pump is disposed within said housing between said inlet and said condenser coil.

11. A heater according to claim 9 wherein:

K. said passing means includes:

1. an air inlet in said housing, 2. an air outlet in said housing, 3. air conduit means extending between said air inlet and said air outlet, and 4. a blower positioned in said air conduit means adjacent said air outlet; and I. said evaporator coil is positioned in said air conduit means between said air inlet and said blower.

12. An engine and generator assembly comprising:

A. a liquid cooled internal combustion engine;

B. a generator driven by said engine;

C. means for extracting heat from the ambient air an imparting it to the coolant flowing through said engine whereby to cool the ambient air and heat the coolant; and D. means for directing the cooled air into heat exchange relation to said generator to cool said generator.

13. An engine and generator assembly according to claim 12 wherein:

E. said means for extracting heat comprises a heat pump including a refrigerant to engine coolant condenser and an air to refrigerant evaporator; and F. the air leaving said evaporator is directed into heat exchange relation with said generator.

14. A heater for use with a stationary diesel engine to maintain the engine at a predetermined temperature, said heater comprising:

(A) a housing;

(B) an inlet for receiving coolant from said engine;

(C) an outlet for discharging coolant for delivery to said engine;

(D) a conduit extending within said housing between said inlet and said outlet;

(E) a condenser coil in heat exchange relation to said conduit;

(F) means for passing a heat exchange fluid through said housing;

(G) an evaporator coil in heat exchange relation to said heat exchange fluid; and (H) means for moving a phase change fluid serially and cyclically through said evaporator and condenser to heat the engine coolant flowing through said conduit.

* * * * *